H. W. HILL.
LENS MACHINERY.
APPLICATION FILED OCT 14, 1919.
1,412,867.
Patented Apr. 18, 1922.
3 SHEETS—SHEET 1.
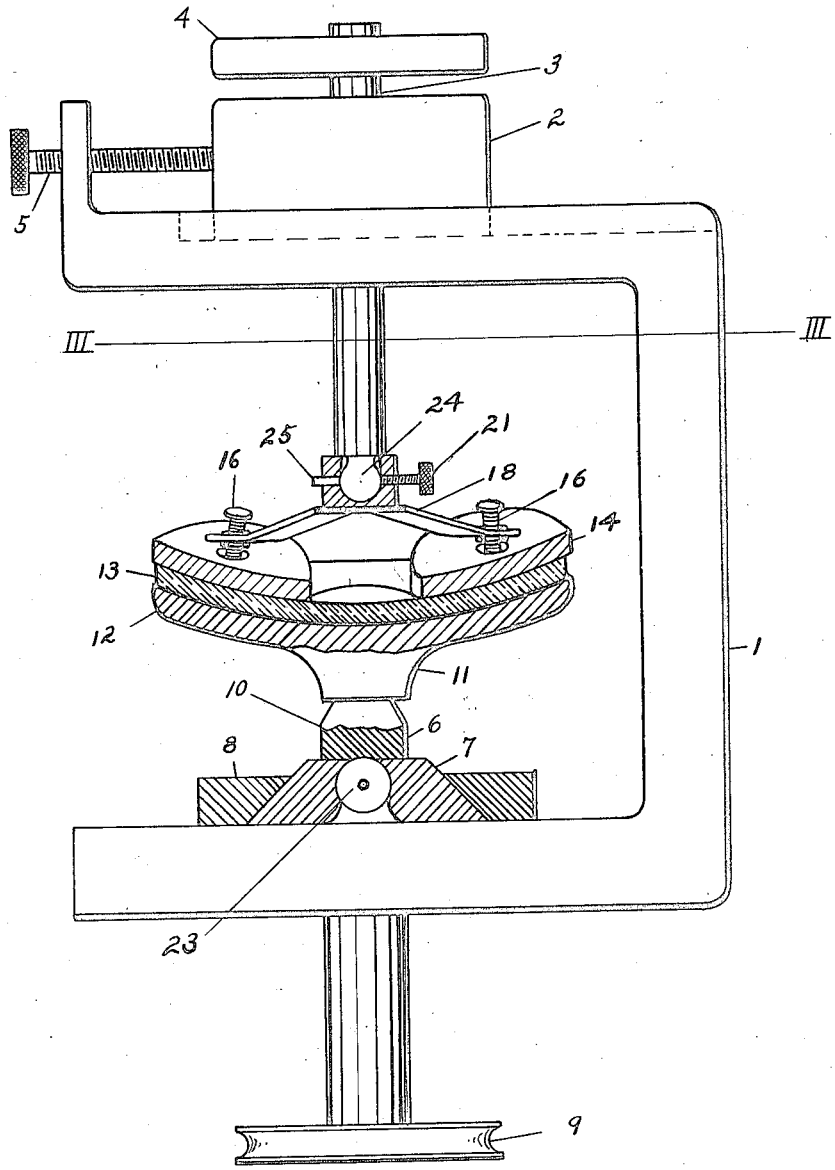
FIG. I
INVENTOR.
HARRY W. HILL
BY
ATTORNEYS.

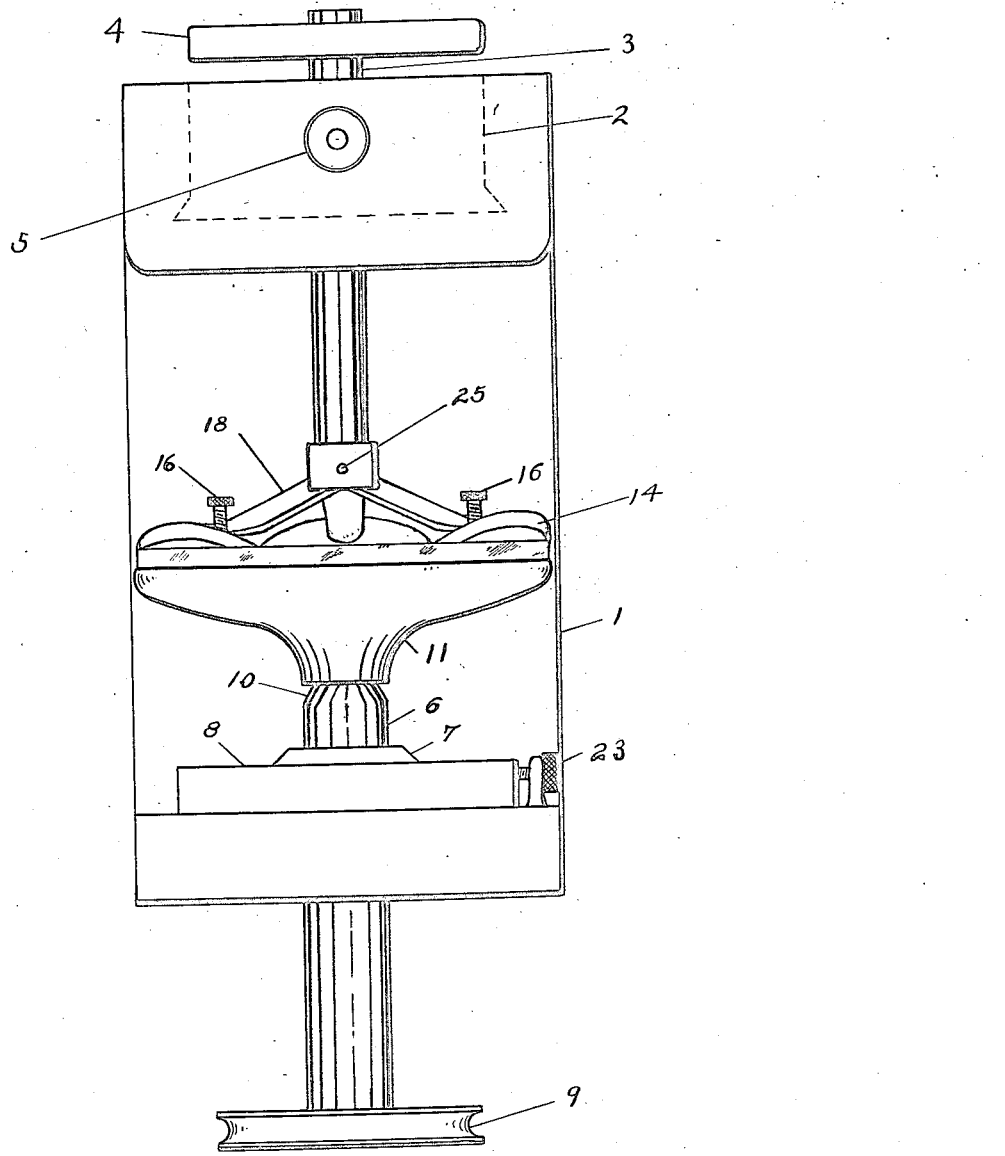
FIG. II

H. W. HILL.
LENS MACHINERY.
APPLICATION FILED OCT 14, 1919.
1,412,867.
Patented Apr. 18, 1922.
3 SHEETS—SHEET 3.
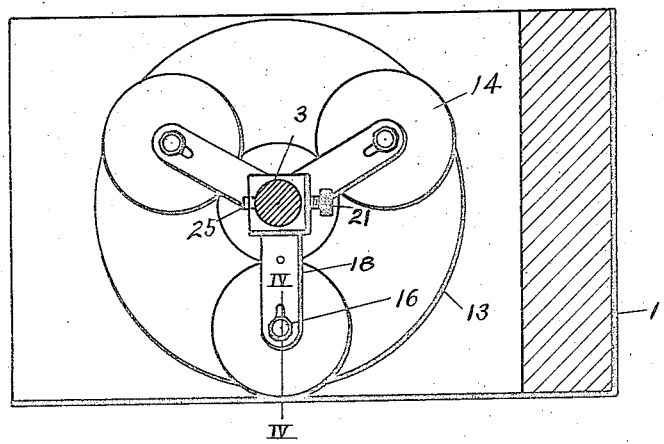
FIG. III
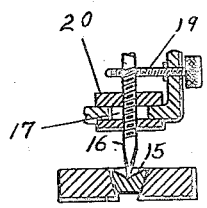
FIG. IV
INVENTOR.
HARRY W. HILL
BY
H. H. Styll & H. K. Parsons
ATTORNEYS.

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS MACHINERY.

1,412,867.  Specification of Letters Patent.  Patented Apr. 18, 1922.

Application filed October 14, 1919. Serial No. 330,562.

*To all whom it may concern:*

Be it known that I, HARRY W. HILL, of Southbridge, in the county of Worcester and State of Massachusetts, have invented certain new and useful Improvements in Lens Machinery, of which the following is a specification.

This invention relates to improvements in lens machinery and has particular reference to novel and improved mechanism particularly adapted for the production of ophthalmic lenses.

One of the leading objects of the present invention is the provision of an improved machine which will facilitate the rapid production of opthalmic lenses and which is particularly adapted to increase the speed of production of lenses of the bifocal type.

A further object of the present invention is the provision of a novel machine of this character which shall be capable of adjustment for various sizes and types of work.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a side elevation with parts in section of one embodiment of my improved machanism.

Figure II represents a front view thereof.

Figure III represents a sectional view as on the line III—III of Figure I.

Figure IV represents a fragmentary sectional view as on the line IV—IV of Figure III.

In the drawings, the numeral 1 designates the main frame of my machine provided with the upper slide block 2 in which is journaled the spindle 3 which may be either rotatably or non-rotatably mounted in the block 2, as preferred, but in either event is vertically slidable and preferably provided with the weighted portion or pully 4 impelling the spindle downwardly, and if desired in addition serving to receive driving power. An adjusting screw 5 carried by the frame 1 may be employed to vary the in and out adjustment of the spindle 3. Opposed to the spindle 3 is a second spindle 6 journaled in the slide 7 in guide-ways 8 on the frame 1 and provided with the drive pully 9 for its rotation. This spindle is provided at its upper end with the tapered portion 10 extending into the socket 11 of a tool or lens holder 12, in the drawings this being illustrated as a block bearing the lens blank 13, which is operated on by the series of tools 14. These tools 14 as illustrated in detail in Figure IV, are provided with the cone sockets 15 adapted to receive the points of the pins 16, permitting of the free oscillation and rotation of the tools 14. These pins extend through slots 17 in the tripod arms 18, being adjusted as by a screw 19 and secured in adjusted position by the lock nuts 20. The tripod itself is mounted on the lower end of the spindle 3 and preferably secured in position as by the use of the set screw 21.

It will be noted that I have shown my invention as employed in the grinding or polishing of the major portion of a bifocal lens, the tools being of size to extend from the edge of the reading portion to that of the distance portion in the case of a merged surface lens, or if desired being slightly oversized to overlap both of said edges as shown in Figure III, when a countersunk bifocal is being ground or polished. The inner surfaces of the tools in question may be of any desired form, either solid or ring tools or the like as preferred, in the present instance the tools 14 being shown as of solid construction having on their faces the curve which is to be produced or followed, as the case may be, on the lens.

It will be understood that while I have shown the present construction as particularly adapted for use in connection with bifocal lenses that my machine is not limited to this use but is universal in application and may be so adjusted as to produce ordinary spherical lenses or other similar surfaces if preferred.

In operation of my machine in the form illustrated in Figures I and II, I have shown the opposed spindles or members 3 and 6 as disposed in alinement one with the other, in which event either one or both of the members 3 and 6 may be driven as preferred, the essential being that a relative rotation between the parts is attained. When used as here illustrated for the production of bifocal lenses, the three pins 16 are preferably adjusted at equal distances from the spindle 3 so that each will occupy the same relation with respect to the edge 22 of the reading portion of the bifocal lens here being produced. In this case the relative rotation of the glass and tools will frictionally rotate the tools 14 about the points of the pins 16 providing the necessary cross motion to prevent scratching or improper polishing of the lens being produced. To facilitate the correct positioning of the pins I have as before mentioned, rendered them adjustable and accurately positionable through the use of the set screws 19.

In some cases, however, I may prefer to have but one of the three tools employed extending exactly up to the edge of the reading portion of the bifocal segment and the others operating slightly away from this line, this being particularly desirable in the event that it is desired to somewhat blur over or semi-grind or polish the lens at this point or blend the two fields one into the other, a feature desired by some members of the optical trade at the present time. When it is desired to accomplish this result I may either have all of the pins 16 adjusted at equal distances from the center of their tripod or holder and may impart slight horizontal adjustment to one or the other of the slides 2 or 7 through the use of the adjusting screws 5 or 23, or I may adjust one of the pins slightly inward with respect to the common center of the several pins, as preferred. Similarly, and particularly if but one spindle is driven, adjustment may be made of one or the other or both spindles to properly position the center point between the several tools in place of it being necessary to loosen the lock nuts and individually adjust the pin 16 to attain this result.

The in and out and lateral relative adjustments of the two spindles are also particularly advantageous when it is desired to so adjust the mechanism that the several tools together will pass over the entire surface of the lens to produce a continuous surface in place of a bifocal surface.

An additional advantage also accomplishable with my improved machine by proper adjustment is that if desired both surfaces of the lens may be simultaneously operated upon by my machine by proper selection of size of tools and relative adjustment of the parts so that one arm of the tripod or other form of carrier and its pin 16 overlie the central or reading portion of the lens blank, while the other arms operate upon the distance portion, the whole lens thus being ground or polished in a single operation. It is to be noted that I have shown the connection between the spindle 3 and the tripod in the form of a ball 24 having the laterally projecting arm 25 interlocking with the central portion or ball socket of the tripod. The purpose of this is to allow of rocking movement of the tripod on the bottom of the spindle and at the same time the arm 25 interlocking with the socket serves to drive the tripod with the spindle 3 or to hold it against rotation in those instances where the spindle is not rotated. The thumb screw 21 may be caused to bind against the ball just sufficient to prevent slipping of the tripod off the spindle when raised or clamped thereagainst to supplement the action of the arm 25 in holding the parts against relative movement. In this connection I wish to call attention to the fact that for convenience of identification I have employed the term tripod in referring to the holder formed by the arms 18, but I do not intend to be limited to a three arm construction as four arms or other number may be made use of if preferred without in anywise departing from my invention.

I claim:

1. A lens machine including a frame, a pair of spindle members mounted in the frame for horizontal adjustment in two angularly related directions, a lens holder carried by one of the spindles, a plurality of radiating arms carried by the other of the spindles bearing pins on the arms, and lens grinding tools mounted on the pins.

2. A lens grinding machine including opposed spindles respectively adapted to hold the lens and tools for operating upon the lens, a lens operating tool holder including divergent arms, cone bearing points adjustable longitudinally of the arms, lens surfacing tools carried by said bearings, means for relatively horizontally shifting the axes of the opposed spindles, and additional means for shifting said axes in a horizontal direction at an angle to that of the first mentioned movement.

In testimony whereof I have affixed my signature, in presence of two witnesses.

HARRY W. HILL.

Witnesses:
H. E. COLEMAN.
ALICE G. HASKELL.